(12) United States Patent
Kusano et al.

(10) Patent No.: US 8,048,575 B2
(45) Date of Patent: Nov. 1, 2011

(54) FUEL CELL SYSTEM AND FUEL CELL AUTOMOTIVE VEHICLE

(75) Inventors: Yoshio Kusano, Saitama (JP);
Toshikatsu Katagiri, Saitama (JP);
Ryoichi Yoshitomi, Utsunomiya (JP);
Kenji Nagumo, Saitama (JP); Motohiro Suzuki, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 13/023,348

(22) Filed: Feb. 8, 2011

(65) Prior Publication Data

US 2011/0129741 A1 Jun. 2, 2011

Related U.S. Application Data

(63) Continuation of application No. 10/574,417, filed as application No. PCT/JP2004/014469 on Oct. 1, 2004, now Pat. No. 7,906,241.

(30) Foreign Application Priority Data

Oct. 3, 2003 (JP) ................................. 2003-346405

(51) Int. Cl.
*H01M 8/06* (2006.01)
*H01M 2/40* (2006.01)
*H01M 8/04* (2006.01)
(52) U.S. Cl. .......................... 429/413; 429/512; 429/456
(58) Field of Classification Search .................. None
See application file for complete search history.

(56) References Cited

U.S. PATENT DOCUMENTS

| | | | |
|---|---|---|---|
| 6,455,179 B1 * | 9/2002 | Sugita et al. | 429/471 |
| 2001/0021467 A1 * | 9/2001 | Suzuki et al. | 429/12 |
| 2002/0022171 A1 | 2/2002 | Saito et al. | |
| 2002/0041989 A1 | 4/2002 | Shimanuki et al. | |
| 2002/0142209 A1 * | 10/2002 | Kikuchi et al. | 429/34 |
| 2004/0175605 A1 * | 9/2004 | Eshraghi et al. | 429/31 |

FOREIGN PATENT DOCUMENTS

| | | |
|---|---|---|
| JP | 08-171926 | 7/1996 |
| JP | 2001-068140 | 3/2001 |
| JP | 2001-201122 | 7/2001 |
| JP | 2002-050391 | 2/2002 |
| JP | 2002-056870 | 2/2002 |
| JP | 2002-075418 | 3/2002 |
| JP | 2002-117882 | 4/2002 |
| JP | 2003-187838 | 7/2003 |

* cited by examiner

*Primary Examiner* — Barbara Gilliam
*Assistant Examiner* — Stephan Essex
(74) *Attorney, Agent, or Firm* — Nelson Mullins Riley & Scarborough LLP; Anthony A. Laurentano (57) ABSTRACT

A fuel cell system that is compact and has stabilized performance is provided. The fuel cell system includes two fuel cell stacks or a first fuel cell stack (31) and a second fuel cell stack (32), a high-pressure hydrogen tank (11) as a hydrogen supplying device for supplying hydrogen to the first and second fuel cell stacks (31, 32), a compressor (12) as an air supplying device for supplying air to the fuel cell stack, and a humidifier (20) for humidifying air to be supplied to the first and second fuel cell stacks (31, 32). The humidifier (20) is disposed between the first and second fuel cell stacks (31, 32); a supply air exhaust port of the humidifier (20) and air supply ports (Q1) of the first and second fuel cell stacks (31, 32) are connected by air supply pipes (51) having the same length.

6 Claims, 7 Drawing Sheets

FUEL CELL SYSTEM AND FUEL CELL AUTOMOTIVE VEHICLE

RELATED APPLICATIONS

This application is a continuation of, and claims priority to, U.S. patent application Ser. No. 10/574,417, filed on Apr. 3, 2006, which is a 35 U.S.C. §371 national phase filing of International Application No. PCT/JP2004014469 filed on Oct. 1, 2004, which claims priority to Japanese Patent Application No. 2003-346405, filed on Oct. 1, 2003 in Japan. The contents of the aforementioned applications are hereby incorporated by reference.

TECHNICAL FIELD

This invention relates to fuel cell systems and fuel cell automotive vehicles, and more specifically to a fuel cell system and a fuel cell automotive vehicle having a humidifier and two fuel cell stacks.

BACKGROUND ART

Recently, fuel cells, in particular polymer electrolyte fuel cells, have been receiving attention as clean and energy-efficient fuels for various applications, for example, in powering the electric cars. The fuel cell is, in essence, a generator which electrochemically produces electricity upon receipt of fuel gas (hydrogen) and oxidant gas (air). The polymer electrolyte fuel cell is provided in its inside with an electrolyte membrane composed of proton conductive solid polymers, which electrolyte membrane works well in humidified conditions. In a polymer electrolyte fuel cell system is thus provided a humidifier for humidifying a dry oxidant gas to be supplied to a fuel cell stack (for example, see Patent document 1).

The aforementioned fuel cell stack is a power-generating component with a plurality of single cells stacked on top of each other in layers, and each single cell is comprised of a solid polymer membrane sandwiched between separators; the number and size of the single cells may be determined according to the voltage or power required for an intended application such as a fuel cell automotive vehicle.

The aforementioned humidifier, for example, is constructed with a moisture vapor-exchangeable hollow fiber membrane provided therein, and an oxidant gas discharged from the fuel cell stack (hereinafter referred to as "exhaust gas") is passed outside the hollow fiber membrane and inside the humidifier while a newly supplied oxidant gas is passed inside the hollow fiber membrane so that moisture vapors contained in the exhaust gas are transferred into the newly supplied oxidant gas.

Patent Document 1: JP 2002-75418 A (Paragraph 0016, FIGS. 1 and 3)

DISCLOSURE OF INVENTION

Problems to be Solved by the Invention

The fuel cell system as described above needs humidified oxidant gas, which would possibly cause condensation inside an oxidant gas passage, in particular, inside the hollow fiber membrane in the humidifier, which would in turn obstruct the flow of oxidant gas, thus disadvantageously impairing the efficiency of the fuel cell system. Further, it would be desirable to provide a fuel cell stack in an application in a space-saving manner when the fuel cell system is installed in the application.

The present invention has been made in view of these circumstances, and it is an object of the present invention to provide a fuel cell system and a fuel cell automotive vehicle with stabilized performance of the fuel cells as well as space-saving construction in installation of the system in an application.

Means for Solving the Problems

To solve the above problems, a fuel cell system according to the present invention comprises: at least two fuel cell stacks configured to receive supplied reaction gases comprised of an oxidant gas and a fuel gas to generate electricity by electrochemical reaction; a humidifier configured to humidify at least one of the reaction gases to be supplied to the fuel cell stacks; and a reaction gas supply pipe configured to feed the reaction gas from a reaction gas exhaust port of the humidifier to reaction gas supply ports of two of the fuel cell stacks. The humidifier is disposed between the two fuel cell stacks, and the reaction gas supply pipe is bifurcated at a bifurcation point into two portions directed toward the two fuel cell stacks respectively, the lengths of the portions from the bifurcation point to the reaction gas supply ports of the two fuel cell stacks being substantially the same.

According to this fuel cell system, the two fuel cell stacks as thus separately provided allow greater layout flexibility and weight balance improvement of the fuel cells to be installed in an application. Meanwhile, such separate provision of the two fuel stacks would impair the efficiency of one of the fuel cell stacks if supply of the reaction gases to the respective fuel cell stacks were not equalized. However, in the fuel cell system according to the present invention, the reaction gas exhaust port of the humidifier and the respective reaction gas supply ports of the two fuel cell stacks are connected through the bifurcated reaction gas supply pipe with the lengths of the portions from the bifurcation point to the reaction gas supply ports of the two fuel cell stacks being substantially the same; therefore, the supply of the reaction gas to the two fuel cell stacks is evenly balanced. The portions of reaction gas supply pipe directed toward the two fuel cell stacks may preferably have the same thickness.

Further, in this fuel cell system, since the humidifier is disposed between the two fuel cell stacks, heat generated from the fuel cells adequately raises the temperature of the humidifier. Therefore, the reaction gas is rising in temperature during humidification in the humidifier, which thus prevents condensation from forming in passages within the humidifier through which the reaction gas passes. Resultantly, the reaction gas flows in a steady stream, so that the fuel cells can operate stably.

For the above-described fuel cell stacks, the humidifier may be configured as a membrane type humidifier to transfer moisture contained in an exhaust gas discharged from the fuel cell stacks, through a water-permeable membrane to the reaction gas. In this configuration, condensation that would otherwise form on surfaces of the water-permeable membrane can be prevented, which thus serves to maintain the humidification efficiency; therefore, the inventive feature can be utilized to great advantage.

For the fuel cell stacks provided with such a humidifier using a water-permeable membrane as described above, it would be preferable that the water-permeable membrane in the humidifier is in a shape comprised of hollow fibers aligned in one direction, each fuel cell stack being comprised of single cells stacked in a longitudinal direction of the tubular hollow fiber water-permeable membrane, the reaction gas supply port being formed at one end face of the fuel cell stack facing in a direction in which the single cells are stacked, and the reaction gas exhaust port being oriented toward a same direction as the two reaction gas supply ports face.

According to the fuel cell system as described above, the both of the reaction gas exhaust port of the humidifier and the reaction gas supply ports of the two fuel cell stacks open toward the same direction, while the humidifier is disposed between the two fuel cell stacks. Accordingly, the reaction gas supply pipe connecting the reaction gas exhaust port and the reaction gas supply ports can be designed to be shorter in length. Consequently, pressure loss of the reaction gas can be reduced and the likelihood of condensation within the reaction gas supply pipe can be minimized.

In the above fuel cell system, it would be preferable that the two fuel cell stacks are arranged side-by-side relative to the horizontal, whereas the humidifier comprises at least two sets of substantially cylindrical humidifiers arranged vertically adjacent to each other, and an exhaust gas discharge pipe configured to carry the exhaust gas discharged from the humidifier is disposed in a position surrounded by two sets of the humidifiers and one of the fuel cell stacks.

In this embodiment where the exhaust gas discharge pipe is, as described above, disposed in a position surrounded by several substantially cylindrical humidifiers and one of the fuel cell stacks, dead space can be utilized effectively so that compact design of the fuel cell system can be facilitated.

In accordance with the present invention, which may be embodied as a fuel cell automotive vehicle to provide a solution for the problems described above, there is provided a fuel cell automotive vehicle equipped with a fuel cell system which comprises: two fuel cell stacks; a hydrogen supplying device configured to supply hydrogen to the fuel cell stacks; an air supplying device configured to supply air to the fuel cell stacks; and a humidifier configured to humidify air to be supplied to the fuel cell stacks. In this fuel cell automotive vehicle, the fuel cell stacks and the humidifier are disposed under a floor of the vehicle, transversely with respect to the vehicle, with the two fuel cell stacks located symmetrically rightward and leftward respectively about the humidifier, the air supplying device is disposed frontwardly of the fuel cell stacks and the humidifier, and the hydrogen supplying device is disposed rearwardly of the fuel cell stacks and the humidifier, whereas the humidifier comprises a supply air introduction port facing toward frontward of the vehicle and a supply air exhaust port facing toward rearward of the vehicle, and the fuel cell stacks each comprises an air supply port and a hydrogen supply port both facing toward rearward of the vehicle.

According to the fuel cell automotive vehicle as described above, since the air supplying device is disposed frontwardly in the vehicle while the supply air introduction port of the humidifier faces toward frontward of the vehicle, the piping connecting them can be designed to have a shorter length. Also, since the hydrogen supplying device is disposed rearwardly in the vehicle while the hydrogen supply port faces toward rearward of the vehicle, the piping connecting them can be designed to have a shorter length. Moreover, since the supply air exhaust port of the humidifier faces toward rearward of the vehicle while the air supply port of the fuel cell stacks faces toward the rearward of the vehicle, the piping connecting them can be designed to have a shorter length, as well.

In the above-described fuel cell automotive vehicle, preferably, further provided is a cooling water supply pipe configured to carry a cooling water to be supplied to the fuel cell stacks, wherein an air supply pipe configured to carry air to be supplied to the fuel cell stacks and a hydrogen supply pipe configured to carry hydrogen to be supplied to the fuel cell stacks, as well as the cooling water supply pipe, are combined together to form a monolithic manifold. In this embodiment where the reaction gas supply pipe, hydrogen supply pipe and cooling water supply pipe are combined together to form a monolithic manifold, the piping installation for these supply pipes can be achieved simply by mounting a single manifold, so that manufacturability is enhanced.

Provided as an alternative embodiment of the fuel cell system, is a fuel cell system which comprises: at least two fuel cell stacks configured to receive supplied reaction gases comprised of an oxidant gas and a fuel gas to generate electricity by electrochemical reaction; and a humidifier configured to humidify at least one of the reaction gases to be supplied to the fuel cell stacks, wherein the humidifier is disposed between the two fuel cell stacks.

In this fuel cell system, since the humidifier is disposed between the two fuel cell stacks, heat generated from the fuel cells adequately raises the temperature of the humidifier. Therefore, the reaction gases are rising in temperature during humidification in the humidifier, which thus prevents condensation from forming in passages within the humidifier through which the reaction gases pass. Resultantly, the reaction gases flow in a steady stream, so that the fuel cells can operate stably. Further, the two fuel cell stacks that are provided separately increase layout flexibility of the system to be installed in an application In this fuel cell system, preferably, the fuel cell stacks may each comprise end plates provided at both ends of stacked single cells, wherein the humidifier and the end plates of the fuel cell stacks are coupled to each other. In this embodiment where the fuel cell stacks and the humidifier are combined together in a single unit, even when vibrations are transmitted to the fuel cell system, no extra stress concentration takes place on the piping that connects the fuel cell stacks and the humidifier, and gas-tightness can be maintained.

In addition, the two fuel cell stacks and the humidifier may preferably be placed within a fuel cell box, wherein the end plates of the two fuel cell stacks are fixed to the fuel cell box. In this embodiment where the fuel cell stacks and the fuel cell box are combined together in a single unit, the rigidity of the fuel cell system is enhanced, and thus the resonance frequency is increased so that resonance can be suppressed.

In the fuel cell systems defined above, preferably, the two fuel cell stacks may be arranged side-by-side relative to the horizontal, wherein the humidifier comprises at least two sets of substantially cylindrical humidifiers arranged vertically adjacent to each other.

With this setup, narrow space between the two fuel cell stacks can be utilized effectively so that compact design of the fuel cell system can be facilitated.

Additionally, this fuel cell system may preferably comprise reaction gas pipes configured to carry the reaction gases, and disposed in a position surrounded by two sets of the humidifiers and one of the fuel cell stacks. In this embodiment, dead space can be utilized effectively so that compact design of the fuel cell system can be facilitated.

In an alternative embodiment where the above-described humidifier is configured as a membrane type humidifier to humidify the reaction gases through a hollow fiber water-permeable membrane, wherein the hollow fiber water-permeable membrane includes bundled hollow fibers each having a tubular shape of which a longitudinal direction is parallel with a direction in which single cells of the fuel cell stacks are stacked, the piping between the humidifier and the fuel cell stacks can be designed to be as short as possible.

According to the fuel cell system defined above, the supply of the reaction gas from the humidifier to the two fuel cell stacks is evenly balanced, and the humidifier is heated by the fuel cell stacks, which prevents condensation from occurring in the reaction gas passage within the humidifier, thus enabling the fuel cells to operate stably. Further, provision of two separate stacks of the fuel cells makes it possible to improve the flexibility in layout and/or weight balance thereof.

According to the fuel cell system described above, the advantageous effects expected in the fuel cell system of the first invention can be achieved more effectively.

According to the fuel cell system described above, the reaction gas supply pipe can be rendered shorter, so that the likelihood of condensation within the reaction gas supply pipe can be minimized.

According to the fuel cell system described above, the dead space can be utilized effectively, and the fuel cell system can be designed in a space-saving manner.

According to the fuel cell automotive vehicle described above, the piping for supplying air or hydrogen to the fuel cells can be rendered shorter.

According to the fuel cell automotive vehicle described above, manufacturability of the fuel cell system can be improved.

According to the fuel cell system described above, condensation is prevented in the reaction gas passage within the humidifier, so that the fuel cells can operate stably.

According to the fuel cell system described above, no extra stress concentration takes place on the piping which connects the fuel cell stacks and the humidifier, and the gas-tightness can be maintained.

According to the fuel cell system described above, the rigidity of the fuel cell system is enhanced, and thus the resonance frequency is increased so that resonance can be prevented.

According to the fuel cell system described above, compact design of the fuel cell system can be achieved.

BRIEF DESCRIPTION OF DRAWINGS

FIG. 3(a) is an exploded perspective view of a humidifier 20 and a fuel cell stack 30 as viewed from rearward of a vehicle; (b) is an exploded perspective view of a single cell FC.

FIG. 6 is a cross section of a humidifier 20a.

BEST MODE(S) FOR CARRYING OUT THE INVENTION

Figure 1:
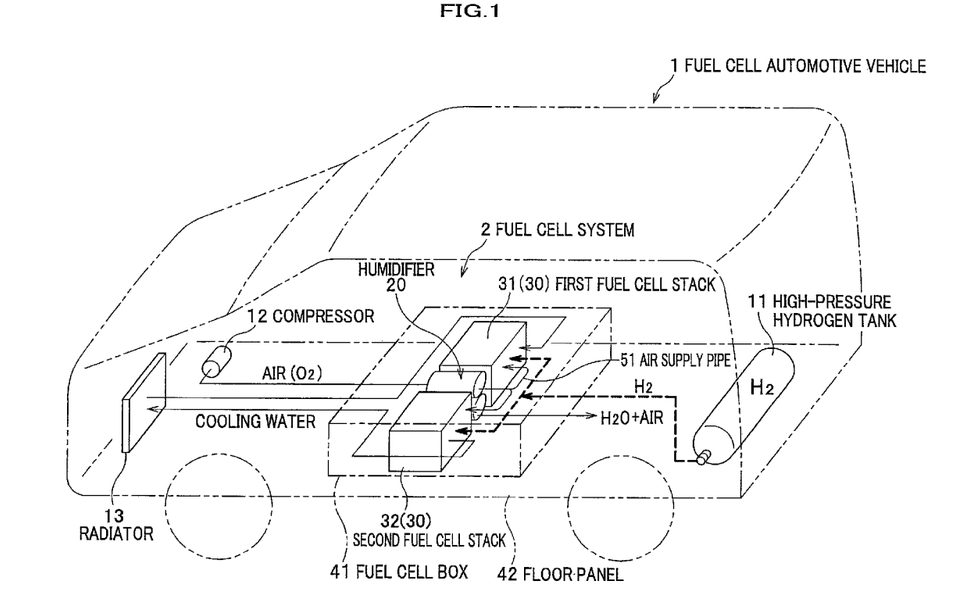
FIG. 1 is a perspective view illustrating a construction of a fuel cell automotive vehicle 1 with a fuel cell system 2 installed therein, in accordance with an embodiment.
Figure 2:
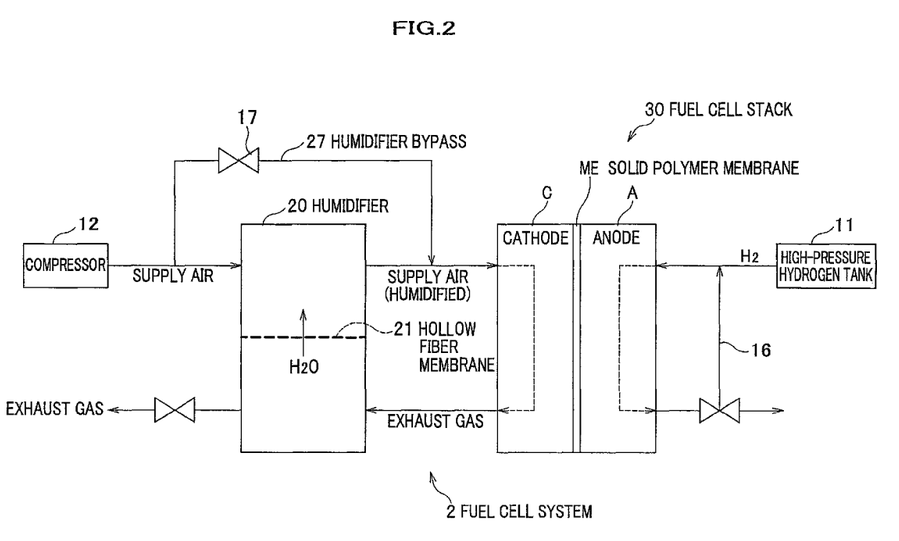
FIG. 2 is a schematic diagram illustrating an outline of the fuel cell system 2 in accordance with an embodiment.

Next, a detailed description will be given of embodiments of the present invention with reference made to the drawings where appropriate. FIG. 1 is a perspective view illustrating a construction of a fuel cell automotive vehicle 1 with a fuel cell system 2 installed therein, according to an embodiment; and FIG. 2 is a schematic diagram illustrating an outline of the fuel cell system 2 according to an embodiment.

As shown in FIG. 1, the fuel cell automotive vehicle 1 according to an embodiment is an automobile in which a fuel cell system 2 is installed. The fuel cell system 2 principally includes a high-pressure hydrogen tank 11 configured as a hydrogen supplying device to provide a supply of hydrogen as a fuel gas, a compressor 12 configured as an air supplying device to provide a supply of air as an oxidant gas, a humidifier 20, and a fuel cell stack 30. The fuel cell stack 30 is comprised of a first fuel cell stack 31 and a second fuel cell stack 32, which are arranged side-by-side (relative to the horizontal) in the fuel cell automotive vehicle 1 (vehicle); the humidifier 20 is disposed between the first fuel cell stack 31 and the second fuel cell stack 32. The first fuel cell stack 31 and the second fuel cell stack 32 are disposed symmetrically to the right and left of the fuel cell automotive vehicle 1, so that the fuel cell automotive vehicle 1 maintains its widthwise balance of weight.

Hydrogen discharged from the high-pressure hydrogen tank 11 and air humidified while passing through the humidifier 20 are supplied to the fuel cell stack 30, in which they react electrochemically with each other to generate electromotive force.

The fuel cell system 2 also includes a radiator 13 as a heat exchanger using cooling water to cool the fuel cell stack 30. The cooling water cooled in the radiator 13 is circulated through insides of the first fuel cell stack 31 and the second fuel cell stack 32, back to the radiator 13.

Among the aforementioned components of the fuel cell system 2, the humidifier 20, the first fuel cell stack 31 and the second fuel cell stack 32 are housed in the fuel cell box 41. The fuel cell box 41 is fixed to a main frame extending in the front-rear direction of the vehicle under a floor panel 42 (under the floor of the vehicle).

Next, a general description will be given of the fuel cell system 2, component by component, with reference to FIG. 2. Hydrogen discharged from the high-pressure hydrogen tank 11 is supplied to an anode A of the fuel cell stack 30. Part of hydrogen not consumed at the anode A is passed through a circulation line 16 and supplied again to the anode A.

Air (hereinafter referred to as "supply air") discharged from the compressor 12 is humidified in the humidifier 20 and then supplied to a cathode C of the fuel cell stack 30. Further provided therein is a humidifier bypass 27 configured to carry and cause part of the supply air from the compressor 12 to be detoured around the humidifier 20 and led to the cathode C, so that an appropriate amount of the supply air is supplied through the humidifier bypass 27 to the cathode C in order to adjust the humidity of the supply air. The amount of the supply air to be passed through the humidifier bypass 27 is adjusted with a valve 17.

When the anode A is supplied with hydrogen as a fuel gas and the cathode C is supplied with air containing oxygen as an oxidant gas, hydrogen ions which are generated at the anode A by catalytic reaction, migrates through a solid polymer membrane ME to the cathode C, at which the hydrogen ions electrochemically react with oxygen in the presence of a catalyst to generate electricity, and produce water.

Air discharged from the cathode C (exhaust gas) contains water generated in the fuel cell stack 30, and is supplied to the humidifier 20 to humidify the supply air. In the humidifier 20, water (moisture vapors) is exchanged between the exhaust gas and the supply air through a hollow fiber membrane 21 that is a water-permeable membrane. The exhaust gas discharged from the humidifier 20 is released into the atmosphere.

Referring now to FIGS. 3 through 7, the humidifier 20 and the fuel cell stack 30 will be brought up for discussion in more details.

Figures 3A, 3B:
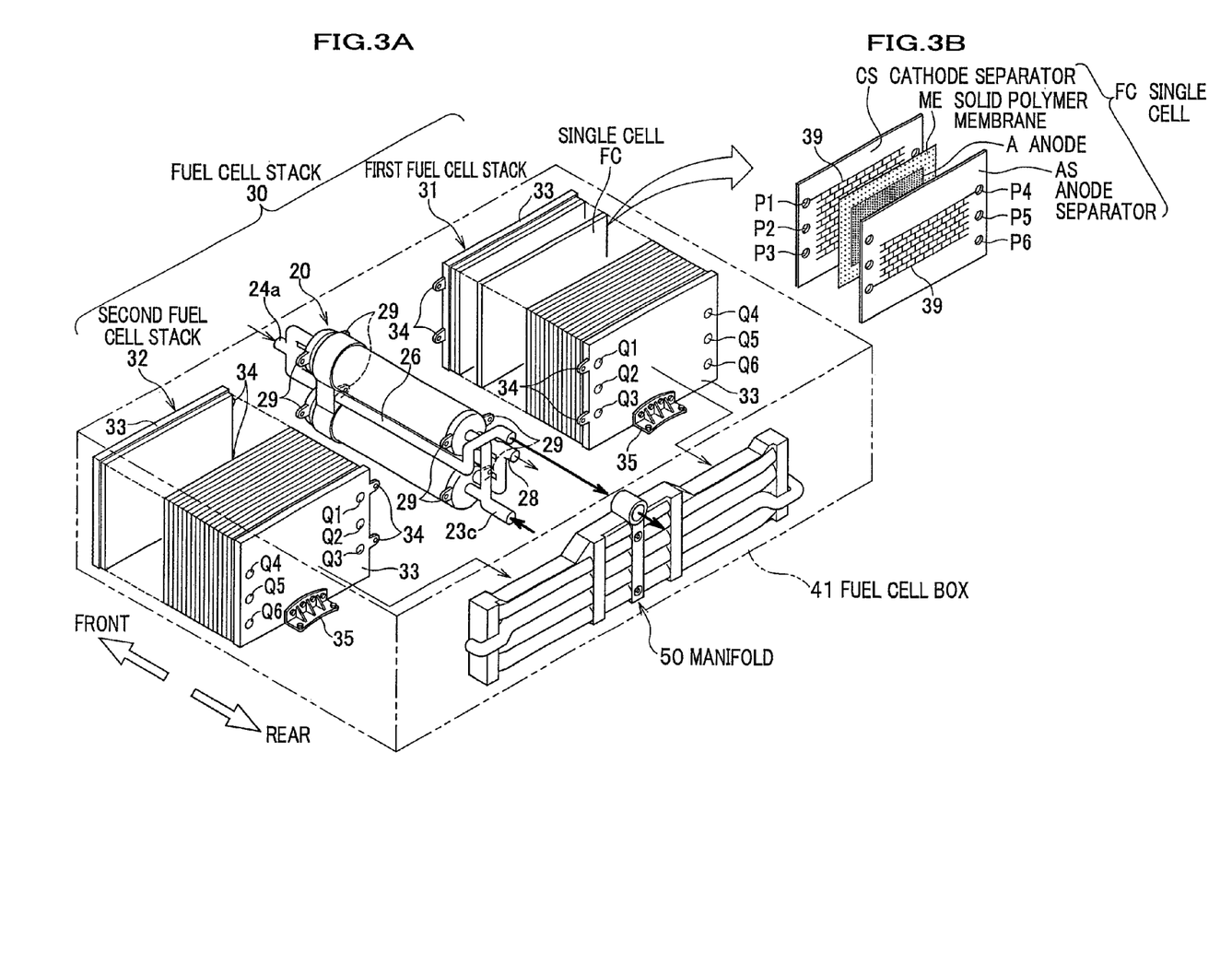
Figure 4:
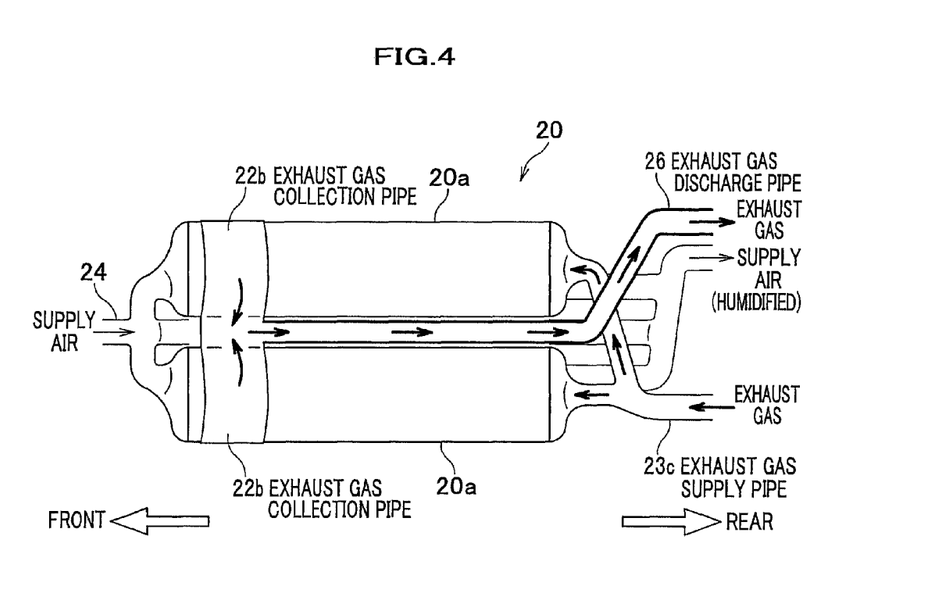
FIG. 4 is a side elevation of the humidifier 20 as viewed from leftward of the vehicle.
Figure 5:
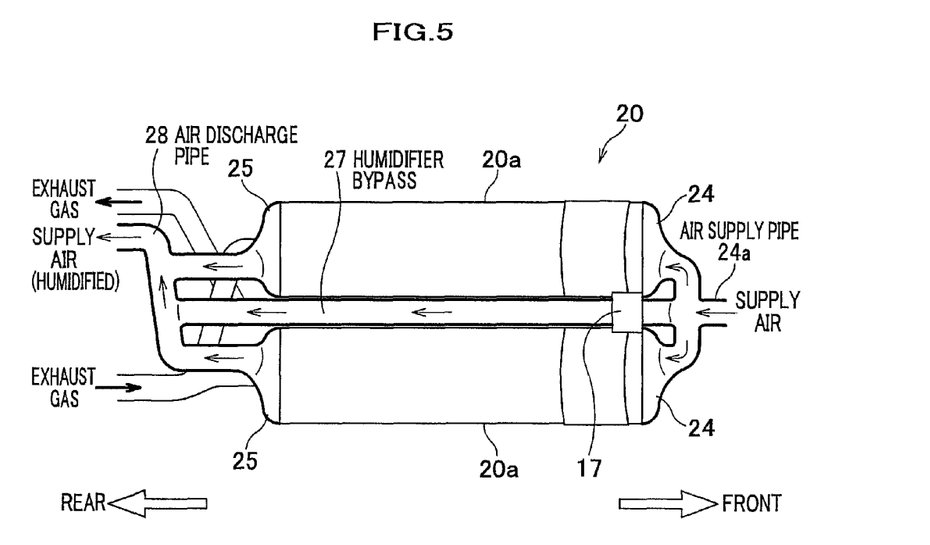
FIG. 5 is a side elevation of the humidifier 20 as viewed from rightward of the vehicle.
Figure 6:
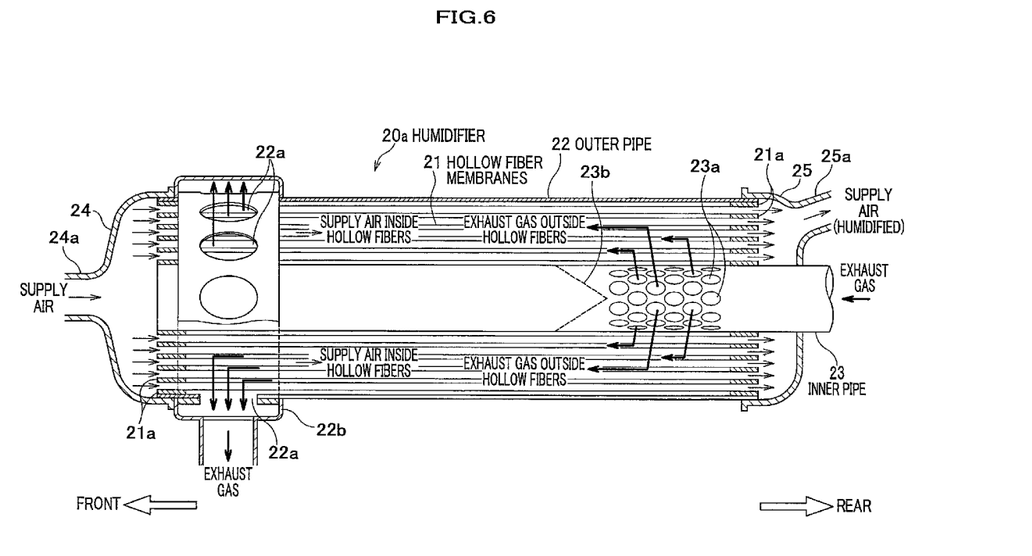
Figure 7:
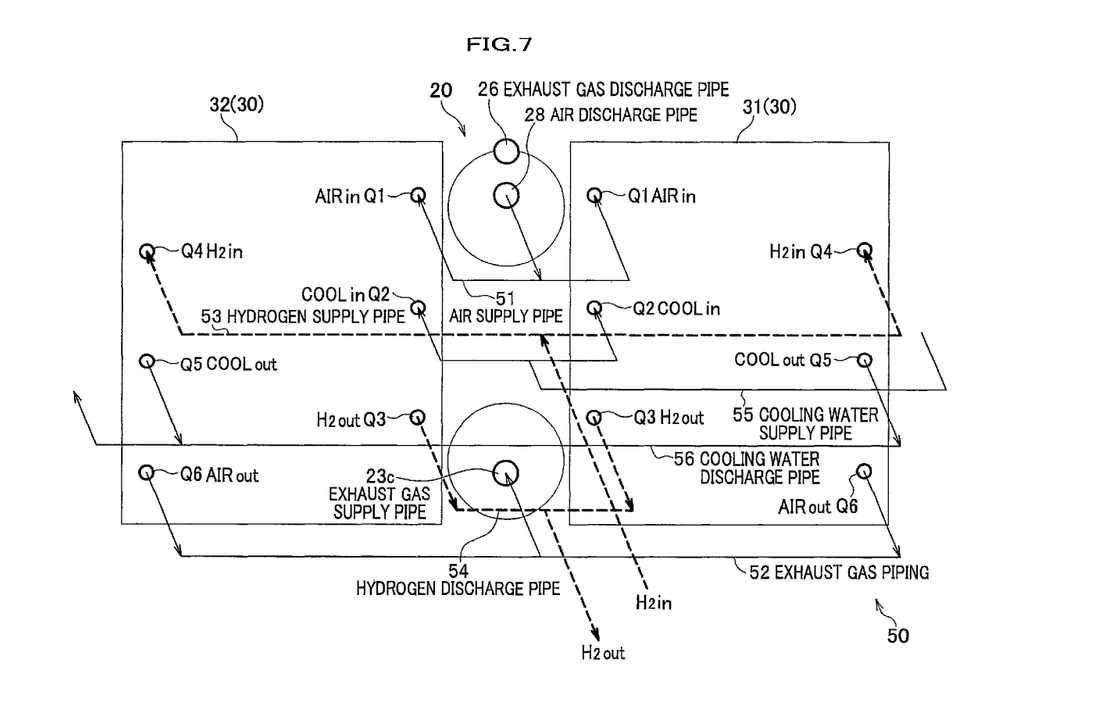
FIG. 7 is a perspective view of piping of the humidifier 20 and the fuel cell stack 30 as viewed from rearward of the vehicle.

FIG. 3(a) is an exploded perspective view of a humidifier 20 and a fuel cell stack 30 as viewed from rearward of a vehicle; (b) is an exploded perspective view of a single cell FC. FIG. 4 is a side elevation of the humidifier 20 as viewed from leftward of the vehicle; FIG. 5 is a side elevation of the humidifier 20 as viewed from rightward of the vehicle; FIG. 6 is a cross section of a humidifier 20a; and FIG. 7 is a perspective view of piping of the humidifier 20 and the fuel cell stack 30 as viewed from rearward of the vehicle.

As shown in FIG. 3(a), the humidifier 20 is comprised of two units arranged vertically adjacent to each other between the first fuel cell stack 31 and the second fuel cell stack 32.

The first fuel cell stack 31 and the second fuel cell stack 32 each have several tens or hundreds of single cells FC stacked on top of each other, each of which is a unit of fuel cell. Each of the single cells FC includes, as shown in FIG. 3(b), an anode separator AS and a cathode separator CS which are thin plates made of carbon or stainless steel, and a membrane electrode assembly (MEA) which are disposed between the anode separator AS and the cathode separator CS and comprised of a solid polymer membrane ME having a cathode C and an anode A formed thereon. The anode separator AS and the cathode separator CS are shaped to form grooves 39 such that a hydrogen channel and an air channel are formed between the anode separator AS and the solid polymer membrane ME and between the cathode separator CS and the solid polymer membrane ME, respectively. The anode separator AS and the cathode separator CS are also shaped to form grooves 39 such that a cooling water passage is formed between the separators (anode or cathode) of adjacent single cells FC.

Each of the anode separator AS and the cathode separator CS has apertures P1-P6, of which three are arranged along its right edge, and three others are arranged along its left edge. Once the single cells FC are stacked, corresponding apertures P1-P6 are combined respectively to form passages; i.e., the apertures P1 form an air supply passage, the apertures P2 form a cooling water supply passage, the apertures P3 form a hydrogen discharge passage, the apertures P4 form a hydrogen supply passage, the apertures P5 form a cooling water discharge passage, and the apertures P6 form an air discharge passage. The apertures P1 and the apertures P6 are connected to communicate with the aforementioned air passage, the apertures P3 and the apertures P4 are connected to communicate with a hydrogen passage, and the apertures P2 and the apertures P4 are connected to communicate with a cooling water passage.

As shown in FIG. 3(a), the first fuel cell stack 31 and the second fuel cell stack 32 are each provided with end plates 33 that have the same contour as the single cells FC and are disposed at both ends of the single cells FC; the both end plates 33 are fastened together with bolts or the like to form an integrated stack of the single cells FC.

At one side of each end plate 33, which is the inner side relative to the vehicle, are protrusively provided coupling pieces 34 for establishing connection with the humidifier 20. Two coupling pieces 34 are provided for each end plate 33 and disposed at upper and lower positions thereof, while at front and rear ends of each of the first and second fuel cell stacks 31, 32 are disposed the end plates 33, the number of which is four in all; thus, the coupling pieces 34 are provided at eight positions in total.

In the humidifier 20, coupling pieces 29 are formed at positions corresponding to the coupling pieces 34 of the end plates 33, i.e., at upper and lower position on right and left sides of the front and rear ends thereof.

The coupling pieces 34 of the end plates 33 and the coupling pieces 29 of the humidifier 20 are each configured to have a fixing aperture, into which a bolt is inserted and fastened up with a nut, whereby the first fuel cell stack 31, the humidifier 20 and the second fuel cell stack 32 are combined together into a single unit. It is to be appreciated that the method of coupling the end plates 33 and the humidifier 20 is not limited to this method, but for example, stack bolts/nuts, rivets, welding, etc. may be employed, instead.

The four end plates 33 are each fixed to the fuel cell box 41 with fixing brackets 30 of L-like cross section (of which only two disposed rearward are illustrated). The fixing brackets 30 and the end plates 33 are fastened with bolts, and the fixing brackets 30 and the fuel cell box 41 are fastened with bolts, too. Though not illustrated, the fuel cell box 41 is fixed on a floor panel 42 (see FIG. 1) of the vehicle.

The fixing brackets 35 are provided at both ends facing in both directions in which the fuel cells are stacked, so that the fastening force of the fuel cell block is maintained.

Hydrogen, air and cooling water to be supplied to the first and second fuel cell stacks 31, 32 are supplied thereto and discharged therefrom through supply ports or exhaust ports Q1-Q6. For distribution of gases to the supply ports or exhaust ports Q1-Q6, a manifold 50 made of an aluminum alloy or the like is used. The manifold 50 is configured to introduce supply air discharged from the humidifier 20 into the first and second fuel cell stacks 31, 32 and to introduce an exhaust gas discharged from the first and second fuel cell stacks 31, 32 into the humidifier 20, and thus connects the humidifier 20 and the first and second fuel cell stacks 31, 32 in such a manner as to serve these purposes; further details about distribution of gases in the manifold 50 will be described later.

Since the first and second fuel cell stacks 31, 32 are both coupled with the humidifier 20 to form a monolithic body, which is in turn fixed to the fuel cell box 41, as described above, the rigidity can be rendered higher and thus the resonance frequency can be rendered higher enough to prevent resonance from occurring, in comparison with a configuration in which each component is fixed individually to the fuel cell box 41.

Further, the humidifier 20 and the first and second fuel cell stacks 31, 32 are combined together via the coupling pieces 29, 34, so that relative positions of these components are fixed. Accordingly, even when vibrations are transmitted to the fuel cell system 2, no extra stress concentration takes place on the manifold 50, and excellent gas-tightness can be maintained at joints between the manifold 50 and the humidifier 20 or the first and second fuel cell stacks 31, 32.

The next discussion will focus on the details about the humidifier 20.

As shown in FIG. 4, the humidifier 20 is configured as a membrane type humidifier using hollow fiber membranes 21 (see FIG. 6), and comprised of two substantially cylindrical humidifiers 20a that are arranged vertically. Each humidifier 20a includes, as shown in FIG. 6, a tubular outer pipe 22, a tubular inner pipe 23 disposed inside the outer pipe 22, and hollow fiber membranes 21 shaped like hollow fibers made of water-permeable membrane through which moisture can permeate, which hollow fiber membranes 21 are aligned in a longitudinal direction of the outer pipe 22 and packed between the outer pipe 22 and the inner pipe 23. In relation to the fuel cell stack 30, the tubular hollow fiber membranes 21 are aligned in parallel with a direction in which single cells FC are stacked. The hollow fiber membranes 21 are bundled at front and rear end portions thereof, which are adhered to one another to form joint portions 21*a*. The joint portions 21*a* are also adhered to the outer pipe 22 and the inner pipe 23, and thus bores of the hollow fiber membranes 21 alone are open to front and rear ends of the outer pipe 22. On the front end portion of the outer pipe 22 is provided a cap 24 which forms an air supply pipe 24*a* (supply air introduction port), while on the rear end portion thereof is provided a cap 25 which forms an air exhaust port 25*a*.

A plurality of pores 23*a* are formed at a portion covered by the outer pipe 22 and closer to the rear end (but disposed frontwardly of the joint portions 21*a*), and the pores 23*a* connect the inside of the inner pipe 23 with a space that is almost filled with the hollow fiber membranes 21 but still left outside the hollow fiber membranes 21. A partition wall 23*b* that blocks the bore of the inner pipe 23 halfway is provided inside the inner pipe 23 at a position further frontwardly of the pores 23*a*. A plurality of exhaust gas vents 22*a* are provided in a portion closer to the front end of the outer pipe 22 throughout its circumference. Around the exhaust gas vents 22*a*, a belt-like exhaust gas collection pipe 22*b* is formed throughout the circumference to collect the exhaust gas discharged through the exhaust gas vents 22*a*.

In this humidifier 20*a*, supply air is introduced through the air supply pipe 24*a* at the front end, humidified while passing through the bores of the hollow fiber membranes 21, and discharged through the air exhaust port 25*a* at the rear end. On the other hand, the exhaust gas discharged from the fuel cell stack 30 is introduced from the rear end of the inner pipe 23, passing through the pores 23*a* and flowed frontward through the space that is almost filled with the hollow fiber membranes 21 but still left outside the hollow fiber membranes 21. Then, the exhaust gas getting out of the outer pipe 22 through the exhaust gas vents 22*a* is passed through the exhaust gas collection pipe 22*b* and collected together.

Returning to FIG. 4, the piping for the humidifier 20 will be described below.

At the rear ends of the upper and lower humidifiers 20*a* is provided an exhaust gas supply pipe 23*c* through which an exhaust gas discharged from the fuel cell stack 30 is introduced. The exhaust gas supply pipe 23*c* is bifurcated into two portions directed toward and connected with the inner pipes 23 (see FIG. 6) of the upper and lower humidifiers 20*a*, respectively. The exhaust gas collection pipes 22*b* of the upper and lower humidifiers 20*a* are connected together at a side facing toward the left of the vehicle (viewer's side as seen in FIG. 4) into a single pipe, which in turn is connected with an exhaust gas discharge pipe 26 (reaction gas piping). The exhaust gas discharge pipe 26 is disposed along a hollow formed at a portion where the upper and lower humidifiers 20*a* are in contact with each other, so as to extend toward rearward of the vehicle. In other words, the exhaust gas discharge pipe 26 is disposed in a position surrounded by the two humidifiers 20*a* and the second fuel cell stack 32 (see FIG. 3). Accordingly, such a layout of the exhaust gas discharge pipe 26 contributes to the effective use of space and to the miniaturization of the fuel cell system 2.

With such piping as described above, the exhaust gas passing from rearward of the vehicle through the exhaust gas supply pipe 23*c* and the inner pipes 23 is carried outside the hollow fiber membranes 21 in the humidifiers 20*a*, collected by the exhaust gas collection pipes 22*b*, and then discharged through the exhaust gas discharge pipe 26 toward rearward of the vehicle again (see FIG. 6).

Meanwhile, as shown in FIG. 5, the air supply pipe 24*a* is provided frontward, i.e., in a position on a front side facing toward frontward of the vehicle. The air supply pipe 24*a* is trifurcated into three portions of which two are directed toward and connected with the caps 24, and the other is directed toward and connected with a humidifier bypass 27 (reaction gas piping). Passages from the caps 25 at the rear ends and the humidifier bypass 27 are gathered in a position on a rear side facing toward rearward of the vehicle, and connected together to an air discharge pipe 28 (to a reaction gas exhaust port or a supply air exhaust port). The humidifier bypass 27 is disposed along a hollow formed at a portion where the upper and lower humidifiers 20*a* are in contact with each other, so as to extend in the front/rear direction of the vehicle. Thus, the humidifier bypass 27 is disposed in a position surrounded by the two humidifiers 20*a* and the first fuel cell stack 31 (see FIG. 3); therefore, such a layout of the humidifier bypass 27 contributes to the effective use of space and to the miniaturization of the fuel cell system 2.

With such piping as described above, the supply air passing from frontward of the vehicle through the air supply pipe 24*a* and the caps 24 is introduced into the bores of the hollow fiber membranes 21, in which it is humidified, and discharged through the caps 25 and the air discharge pipe 28 toward rearward of the vehicle (see FIG. 6).

Next, turning to FIG. 7, the piping for the fuel cell stack 30 will be described below.

In FIG. 7, the manifold 50 is not illustrated, and only the passages provided in the manifold 50 are shown therein.

As shown in FIG. 7, the air discharge pipe 28 of the humidifier 20 is connected with an air supply pipe 51 (reaction gas supply pipe) in the manifold 50. The air supply pipe 51 is bifurcated into two portions directed toward the right and to the left, respectively, and connected with air supply ports Q1 (reaction gas supply ports, AIRin) disposed in an upper row of inner columns for the fuel cell stack(s) 30. The air supply pipe 51 is bifurcated at a bifurcation point located in a central position between the left and right fuel cell stacks 30 (31, 32) into two portions of which the lengths from the bifurcation point to the air supply ports Q1 are configured to be the same. Therefore, the supply air is supplied to the left and right fuel cell stacks 30 (31, 32) in evenly-balanced proportions.

Air exhaust ports Q6 (AIRout) are provided in a lower row of outer columns for the fuel cell stack(s) 30. Passages to the left and right air exhaust ports Q6 are gathered in exhaust gas piping 52 and connected together to the exhaust gas supply pipe 23*c* disposed in the lower position of the humidifier 20. The exhaust gas piping 52 is gathered in a central position between the left and right fuel cell stacks 30 (31, 32), and the lengths of passages from the left and right air exhaust ports Q6 to a meeting point are configured to be the same. Therefore, the exhaust gas discharged from the left and right fuel cell stacks 30 (31, 32) is forwarded to the humidifier 20 in evenly-balanced proportions.

Hydrogen is supplied from rearward of the vehicle, passing through a hydrogen supply pipe 53, and introduced into hydrogen supply ports Q4 ($H_2$in) provided in the upper row of the outer columns for the fuel cell stack(s) 30. The hydrogen supply pipe 53 is bifurcated at a bifurcation point located in a central position between the left and right fuel cell stacks 30 (31, 32) into two portions of which the lengths from the bifurcation point to the hydrogen supply ports Q4 are configured to be the same. Therefore, the hydrogen is supplied to the left and right fuel cell stacks 30 (31, 32) in evenly-balanced proportions.

Hydrogen exhaust ports Q3 ($H_2$out) are provided in the lower row of the inner columns for the fuel cell stack 30. Passages to the left and right hydrogen exhaust ports Q3 are gathered and connected together to a hydrogen discharge pipe 54, through which the hydrogen is circulated along a central line disposed between the left and right fuel cell stacks 30 (31, 32) toward rearward.

Cooling water is introduced from frontward of the vehicle, detouring around the right side of the fuel cell stack(s) 30, and directed toward rearward of the vehicle. The cooling water passing through a cooling water supply pipe 55 is separated at a bifurcation point thereof located in a central position between the left and right fuel cell stacks 30 (31, 32), to the left and to the right, and introduced into cooling water supply ports Q2 (COOLin) provided in a middle row of the inner columns for the fuel cell stack(s) 30. The cooling water is, after passing through the fuel cell stack(s) 30 to provide cooling, discharged through cooling water exhaust ports Q5 provided in the middle row of the outer columns. A cooling water discharge pipe 57 connected with the cooling water exhaust ports Q5 is configured to cause the cooling water discharged from the left and right fuel cell stack 30 to meet at the left side in the vehicle, and to be circulated to the radiator 13 (see FIG. 1) disposed frontward in the vehicle.

The piping, which includes air supply pipe 51, exhaust gas piping 52, hydrogen supply pipe 53, hydrogen discharge pipe 54, cooling water supply pipe 55, cooling water connection pipe 56, and cooling water discharge pipe 57 as described above, are combined together and configured as a monolithic manifold 50. Therefore, the piping installation for the fuel cell stack(s) 30 and the humidifier 20 can be finished just by fixing a single unit of the manifold 50 to the fuel cell stack(s) 30 an the humidifier 20.

A description will be given of operations and advantageous effects of the fuel cell automotive vehicle 1 and the fuel cell system 2 constructed as described above.

Hydrogen supplied from the high-pressure hydrogen tank 11 as a hydrogen supplying device as shown in FIG. 1 is supplied to a widthwise central portion of the manifold 50 as shown in FIG. 7, distributed to the left and to the right through the hydrogen supply pipe 53, and introduced into the hydrogen supply ports Q4. At this stage, since the lengths of the portions from the bifurcation point to the hydrogen supply ports Q4 are configured to be the same, the hydrogen is distributed to both of the first fuel cell stack 31 and the second fuel cell stack 32 in evenly-balanced proportions.

Thus, the high-pressure hydrogen tank 11 is located rearward in the vehicle, and hydrogen is supplied to the two fuel cell stacks 30 (31, 32) from a rear side thereof, and discharged from the same rear side, so that piping for hydrogen can be designed as short as possible and reduction in the weight and cost of the fuel cell automotive vehicle 1 can be facilitated.

Supply air forwarded from the compressor 12 as shown in FIG. 1 enters the humidifiers 20 (20a) through the air supply pipe 24a located frontwardly thereof as shown in FIG. 3 to undergo humidification, and is thereafter discharged through the air discharge pipe 28 located rearwardly thereof. Then, as shown in FIG. 7, the supply air passing through the air supply pipe 51 is separated to the left and to the right and introduced through the air supply ports Q1 into the fuel cell stack(s) 30.

In this operation, the supply air humidified in the humidifier 20 is gradually raised in humidity, but also raised in temperature due to heat applied from the first fuel cell stack 31 and the second fuel cell stack 32 located at both sides of the humidifier 20. Consequently, condensation that would otherwise tend to occur due to rise in humidity of the supply air can be suppressed.

Moreover, since the lengths of the air supply pipe 51 from the bifurcation point to the right and left air supply ports Q1 are configured to be the same, the supply air can be distributed to both of the first fuel cell stack 31 and the second fuel cell stack 32 in evenly-balanced proportions.

An exhaust gas discharged through the air exhaust ports Q6 located in right and left positions of the fuel cell stack 30 is gathered through the exhaust gas piping 52 as shown in FIG. 7, and introduced into the exhaust gas supply pipe 23c of the humidifier 20. The exhaust gas having entered the humidifier 20 humidifies supply air through hollow fiber membranes 21 in the humidifier 20, and then flows through the exhaust gas collection pipe 22b located frontwardly, to go out of the outer pipe 22. The exhaust gas further routed through the exhaust gas pipe 26 above the manifold 50 is discharged through piping (not shown) toward rearward of the vehicle.

Thus, air is supplied from the compressor 12 to a front end of the humidifier(s) 20, and humidified while passing rearward through the humidifier(s) 20. Discharged from a rear end of the humidifier(s) 20, the air is distributed to the left and to the right in the manifold 50, and supplied to the fuel cell stacks 30. An exhaust gas discharged from a rear end of the fuel cell stacks 30 is supplied to the rear end of the humidifier(s) 20, and after passing through the humidifier(s) 20, discharged toward rearward of the vehicle. Accordingly, since the compressor 12 located frontwardly in the vehicle is connected with the front end of the humidifier(s) 20, the piping for air can be rendered short, and the piping between the humidifier(s) 20 and the fuel cell stacks 30 can be as short as possible by taking advantage of the manifold 50.

Cooling water having cooled in the radiator 13 located frontwardly in the vehicle detours around the right side of the fuel cell stacks 30 toward rearward, and enters the two fuel cell stacks 30 (31, 32); after circulated therein, the cooling water is discharged from the left side of the rear end of the second fuel cell stack 32, and detours around the left side of the fuel cell stacks 30 to return to the radiator 13 located frontwardly in the vehicle.

In this operation, the piping for cooling water is routed from the radiator 13 located frontwardly in the vehicle, detouring around the fuel cell stacks 30, to reach the rear of the fuel cell stacks 30, and thus is long. Since the piping for cooling water should be grounded and the longer the distance from the fuel cells to a ground of the piping, the less likely leakage would occur, detouring to some extent would be desirable.

The fuel cell stack 30 according to the present embodiment is configured to have two separate units, with supply and exhaust ports Q1-Q6 for air and hydrogen concentrated at one common end face thereof, and this construction has the following advantages.

Figure 8:
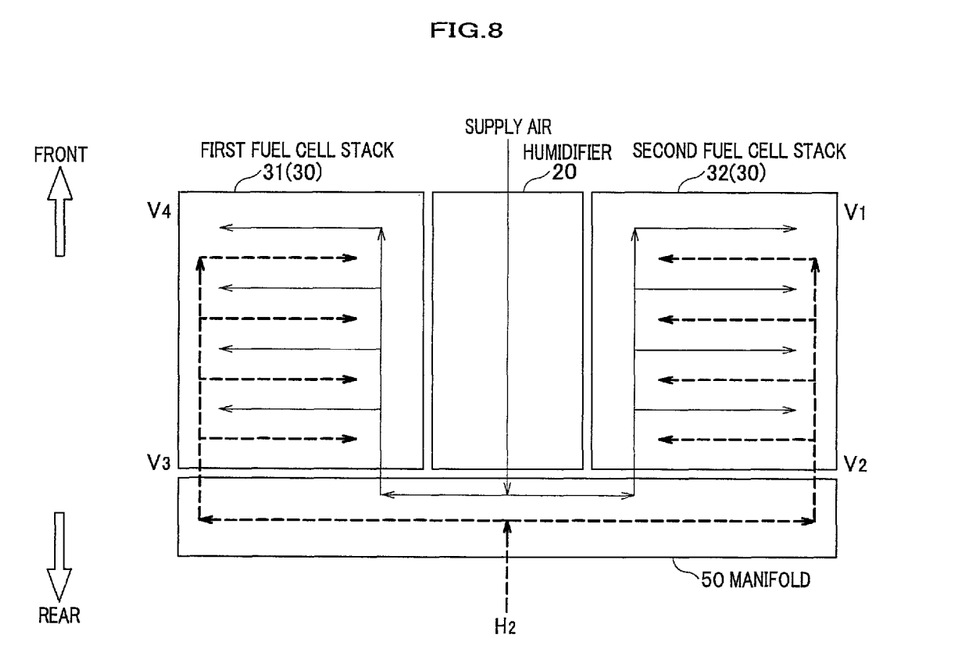
FIG. 8 is a schematic diagram of the fuel cell stack 30 and the humidifier 20 as viewed from above.

FIG. 8 is a schematic diagram of the fuel cell stack 30 and the humidifier 20 as viewed from above. Single cells FC of the first fuel cell stack 31 and the second fuel cell stack 32 are all connected in series; i.e., the order of connection is: the front end and the rear end of the first fuel cell stack 31, and the rear end and the front end of the second fuel cell stack, where the potential increases in this sequence. To be more specific, with the reference characters in FIG. 8, the potential at $V_1$, $V_2$, $V_3$ and $V_4$ increases in this sequence. Hereupon, potential $V_2$ and potential $V_3$ are at electrically contiguous single cells FC, and thus the both potentials measure substantially the same potential. Accordingly, the piping for hydrogen, air and cooling water are concentrated on the face having substantially the same potential, so that the likelihood of electric short-circuit can be minimized.

Although some embodiments of the present invention have been described above, the present invention is, needless to say, not limited to the above-described embodiments, and may be implemented with various modifications and changes made where appropriate. For example, the humidifier 20 may comprise more than two sets of humidifiers, and/or arrangement of the exhaust gas discharge pipe 26 and the humidifier bypass 27 or the like may be reversed left to right.

Although the units of the fuel cell stack 30 are arranged adjacently side-by-side relative to the horizontal, they may be arranged adjacently in the front/rear direction. In an embodiment where three or more fuel cell stacks are provided, the humidifier(s) may be disposed between adjacent fuel cell stacks.

In the illustrated embodiment, the fuel cells are exemplified by those which use a hydrogen gas as a fuel gas, and an oxygen gas as a oxidant gas; however, the present invention is not limited thereto, and other kinds of reaction gases may be used. The humidifier is not limited to those configured to humidify air (oxidant gas), but may be configured to humidify a fuel gas, or both of a fuel gas and an oxidant gas.

The fuel cell system 2 may be applied not only to a fuel cell automotive vehicle but also to a power supply for household appliances.

The invention claimed is:

1. A fuel cell system comprising: at least two fuel cell stacks configured to receive supplied reaction gases comprised of an oxidant gas and a fuel gas to generate electricity by electrochemical reaction; and a humidifier configured to humidify at least one of the reaction gases to be supplied to the fuel cell stacks, wherein the fuel cell stack is configured to pile a membrane electrode assembly (MEA) and separators, wherein a reaction gas supply passage is disposed along a stacking direction, wherein the humidifier is disposed in the space separating the two fuel cell stacks, and wherein the humidifier is configured as a membrane-type humidifier to humidify the reaction gases through a hollow fiber water permeable membrane and the hollow fiber water permeable membrane is aligned in substantially the same direction as an axial direction of a reaction gas supply pipe.

2. A fuel cell system according to claim 1, wherein the fuel cell stacks each comprise end plates provided at both ends of stacked single cells, and the humidifier and the end plates of the fuel cell stacks are coupled to each other.

3. A fuel cell system according to claim 2, wherein the two fuel cell stacks and the humidifier are placed within a fuel cell box, and the end plates of the two fuel cell stacks are fixed to the fuel cell box.

4. A fuel cell system according to claim 1, wherein the two fuel cell stacks are arranged side-by-side relative to the horizontal; and wherein the humidifier comprises at least two sets of substantially cylindrical humidifiers arranged vertically adjacent to each other.

5. A fuel cell system according to claim 4, comprising reaction gas pipes configured to carry the reaction gases disposed in a position surrounded by two sets of the humidifiers and one of the fuel cell stacks.

6. A fuel cell system according to claim 1, wherein the hollow fiber water-permeable membrane includes bundled hollow fibers each having a tubular shape of which a longitudinal direction is parallel with a direction in which single cells of the fuel cell stacks are stacked.

* * * * *